(12) United States Patent
Zhang et al.

(10) Patent No.: US 10,457,580 B2
(45) Date of Patent: *Oct. 29, 2019

(54) DEVICE FOR TREATING A BLACK AND ODOROUS WATER BODY WITH A BIONIC PROCESS

(71) Applicant: Beijing University of Civil Engineering and Architecture, Beijing (CN)

(72) Inventors: Lieyu Zhang, Beijing (CN); Donghai Yuan, Beijing (CN); Jiaxi Li, Beijing (CN); Ying Xiong, Beijing (CN); Guowen Li, Beijing (CN); Caole Li, Beijing (CN)

(73) Assignee: Beijing University of Civil Engineering and Architecture, Beijing (CN)

( * ) Notice: Subject to any disclaimer, the term of this patent is extended or adjusted under 35 U.S.C. 154(b) by 32 days.

This patent is subject to a terminal disclaimer.

(21) Appl. No.: 15/902,707

(22) Filed: Feb. 22, 2018

(65) Prior Publication Data

US 2019/0218124 A1    Jul. 18, 2019

(30) Foreign Application Priority Data

Jan. 16, 2018  (CN) .......................... 2018 1 0041180

(51) Int. Cl.
| | |
|---|---|
| *C02F 3/00* | (2006.01) |
| *C02F 3/20* | (2006.01) |
| *C02F 3/12* | (2006.01) |
| *C02F 3/34* | (2006.01) |
| *C02F 3/30* | (2006.01) |
| *C02F 3/02* | (2006.01) |

(52) U.S. Cl.
CPC .............. *C02F 3/005* (2013.01); *C02F 3/025* (2013.01); *C02F 3/121* (2013.01); *C02F 3/1268* (2013.01); *C02F 3/208* (2013.01); *C02F 3/301* (2013.01); *C02F 3/341* (2013.01); *C02F 3/342* (2013.01); *C02F 2209/06* (2013.01)

(58) Field of Classification Search
CPC ...... H01M 8/16; Y02E 60/527; Y02E 60/528; C12N 11/00; C12N 11/02; C02F 3/1273; C02F 3/301; C02F 3/341; C02F 3/005; C02F 3/121; C02F 3/1268; C02F 3/2866; C02F 2209/06
USPC ......... 210/295, 615, 151; 429/401; 435/174, 435/289.1
See application file for complete search history.

(56) References Cited

U.S. PATENT DOCUMENTS

| | | | |
|---|---|---|---|
| 6,283,309 B1 * | 9/2001 | Koers ..................... | B01D 53/85 210/488 |
| 2006/0251959 A1 * | 11/2006 | Karamanev ......... | H01M 4/8652 429/101 |
| 2016/0329588 A1 * | 11/2016 | Le .......................... | H01M 8/16 |

* cited by examiner

*Primary Examiner* — Claire A Norris
(74) *Attorney, Agent, or Firm* — Fish & Richardson P.C.

(57) ABSTRACT

The present application provides a device for treating a black and odorous water body comprising a pre-treatment unit, a biomimetic intestine tubular purification system which imitates a digestion of small intestine, a microbial fuel cell which imitates a digestion of large intestine, and an inclined tube sedimentation tank which imitates human excretion.

13 Claims, 1 Drawing Sheet

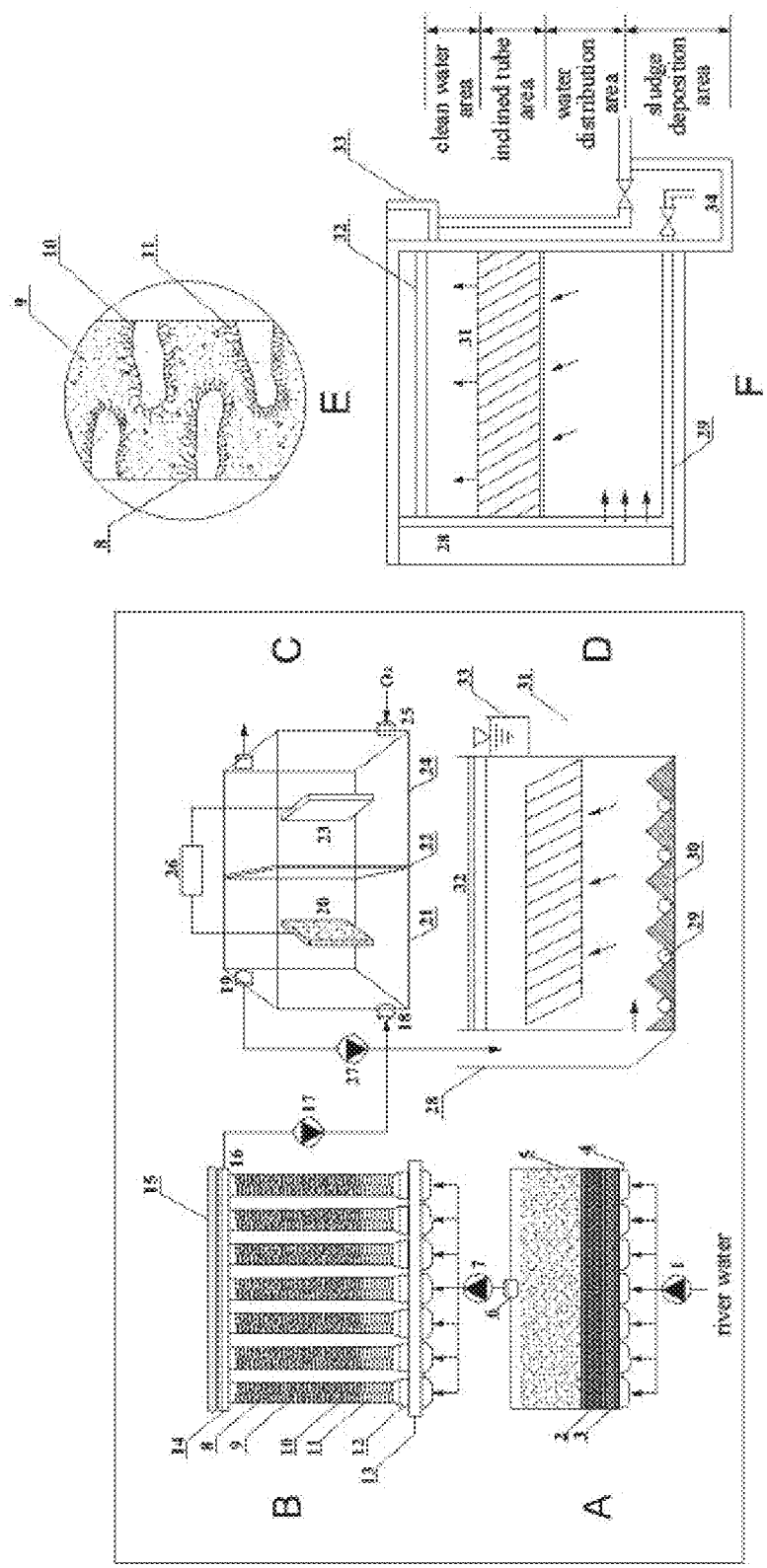

DEVICE FOR TREATING A BLACK AND ODOROUS WATER BODY WITH A BIONIC PROCESS

TECHNICAL FIELD

The present application relates to a device for purifying sewage and a method for using the same, and in particular to a device for treating a black and odorous water body with a bionic process and a method for using the same.

BACKGROUND

The blackening and stinking of river relate to a series of biological and chemical phenomena. The main cause of the blackening and stinking of river is the deposition and fermentation of organic sludge. The oxygen consumption of a great number of organic materials during degradation is more than the oxygen restoration thereof, such that the water body lacks oxygen. Thus, anaerobic microorganisms propagate rapidly and degrade organic materials to produce a number of odorous gases, such as methane, hydrogen sulfide, ammonia and the like, which escape into atmosphere from the water surface to stink the water body. Oxygen deficiency of the water body causes heavy metals such as iron, manganese and the like to be reduced so as to form ferrous sulfide which is predominant in the blackening of the water body with sulfur in the water. Therefore, many researches focus on improving the redox state of a water body and the bottom sludge degradation and oxidation technology, in which aeration oxygenation is one of the most common technologies for improving the redox state of a water body. However, normal aeration device has the disadvantages of low oxygen dissolution and high energy consumption. Micro- and nano-aeration is a new water body aeration technology, and has obvious advantages of high oxygen dissolution and rapid effectiveness. The efficient degradation of bottom sludge organic materials generally involves adding a suitable amount of bottom sludge purification agent into the bottom sludge, and the effect of the purification agent is mainly depending on the degradation and metabolism abilities of the microorganisms therein which degrade the bottom sludge.

SUMMARY

An object of the present disclosure is to provide a method and a device for treating a black and odorous water body with a bionic process. The device of the present disclosure mainly imitates human digestion system to remove contaminants from a water body, and can effectively degrade organic materials and ammonia nitrogen in water, improving the energy conversion efficiency of organic materials and ammonia nitrogen. In practice use, the device can purify water body merely by placing the device into a black and odorous river channel. After purification, the water quality of the outgoing water can meet grade IV of surface water, the chemical oxygen demand can be reduced to 25-30 mg/L, the ammonia nitrogen amount can be reduced to 1.0-1.5 mg/L, and the total phosphorous amount can be reduced to 0.15-0.3 mg/L. The operation of the device is simple. And the device is like a spur dike, which can form reflux and silt deposition, and form a variety of river channel environments such as beach depression, still water area and the like, so as to change a straightening river channel to a zigzag ecological river channel of diversity.

In order to achieve the above object, the present disclosure provides a device for treating a black and odorous water body with a bionic process, mainly comprises: a water inlet system, an aeration unit, a biomimetic intestine tubular purification system, a microbial fuel cell (a microbial fuel cell system (MFC)), an inclined tube sedimentation tank, and a solar cell panel. The device is 1.5 meters in height, 1 meter in length, and 1 meter in width (excluding the solar cell panel). The aeration unit mainly imitates human respiration; the biomimetic intestine tubular purification system mainly imitates the digestion of small intestine; the microbial fuel cell mainly imitates the digestion of large intestine to convert chemical energy to electrical energy; and the inclined tube sedimentation tank mainly imitates human excretion. The solar cell panel is used as an auxiliary power supply to ensure the power supply of the whole system.

The water inlet system essentially consists of a pump and pipelines to sequentially pumping the sludge water at the bottom into the pre-treatment unit, the biomimetic intestine tubular biological membrane, the microbial fuel cell, and the inclined tube sedimentation tank.

The pre-treatment unit provides a location for pre-treating the black and odorous water body, and is used to remove visible large particles, refuse and the like mainly by physically filtering them with thick and thin barriers. The enzyme added is mainly a redox enzyme, such as glucose oxidase, glucose dehydrogenase, ethanol dehydrogenase and the like, and the enzyme added may be one of the aforementioned enzymes or any combination thereof. The pre-treatment of degradation-resistant organic materials such as humus and the like adjusts the pH of the water body between 6.8 and 8.0, and the added amount of the biological enzyme is 100 g biological enzyme per ton river water.

The biomimetic intestine tubular purification system consists of a tubular outer wall, a folded small intestine inner wall, and microorganisms adhering tiny villus. The tubular outer wall comprises more than one tubular structure, and may be made from a hard material such as glass fiber reinforced plastic, polyethylene, polypropylene or the like, or a conducting metal material such as stainless steel or the like. An aerator is disposed at the bottom. The interior of the intestine tubular structure is the folded small intestine inner wall made from polypropylene or polyethylene material. The folded small intestine inner wall is made by imitating human small intestine inner wall in shape, and biomimetic tiny villi consisted of positively charged carbon fibers are densely disposed therein. The densely disposed tiny villi, on one hand, functions to cut bubbles, and on the other hand, are important microorganism carriers. The corridor of the biomimetic intestine tubular purification system is a main location for the biological contact oxidation reaction. The outgoing water from the pre-treatment unit enters the biomimetic intestine from the bottom, and macromolecule organic materials in the black and odorous water body are degraded into small molecule organic materials, while the content of humus is increased. The aeration is dually controlled in terms of the redox potential and dissolved oxygen. When the redox potential is more than 200 mv or the dissolved oxygen is more than 3 mg/L, the aeration is stopped. And when the redox potential is less than 0 mv or the dissolved oxygen is less than 1 mg/L, the aeration starts.

The intestinal probiotics adhered to the folded small intestine inner wall are a class of microorganisms screened from human or animal intestine, which are potent in degrading organic materials but weak in metabolizing organic materials, and have good environment adaptiveness, including anaerobic bacteria, facultative bacteria and aerobic bacteria. The probiotic adheres to the folded small intestine inner wall and villi. The black and odorous water body enters from lower segment and pumped upward, and the probiotic degrades organic materials therein and grows and multiplies with energy. During the starting stage of the system, microorganisms are added regularly. At a beginning of starting of the system, microorganisms are added in an amount of 100 g/m$^3$ river water, and the microorganisms are predominantly *Phascolafctobacterium* and *Eubacterium eligens*. On 12 to 15 days after the starting of the system, *Bacteroides* and Lachnospiraceae *Roseburia* are added in an amount of 120-150 g/m$^3$ river water; and on 180 days after the starting of the system, an intestinal butyric acid-producing bacteria is added in an amount of 200-300 g/L.

Tiny villi cut big bubbles into small bubbles (0.5~200 nm), thereby increasing the dissolution rate of the dissolved oxygen, and producing hydroxyl radicals during the dissolution and breakage of small bubbles, such that degradation resistant organic materials containing benzene ring can be oxidized into small molecule organic materials. The energy generation efficiency of the subsequent microbial fuel cell is improved. Meanwhile, the villi can retain a part of particles. Biological villi employ a carbon fiber material, which will be positively charged after surface treatment.

The microbial fuel cell is made from an organic glass plate, and has a dual chamber structure with a microorganism anode and an air cathode. A glass fiber is used as the proton exchange membrane between the anode chamber and the cathode chamber. Water inlet and outlet and gas inlet and outlet are respectively disposed at two ends of the device. External electrical appliance and external circuit are connected with the electrodes via a lead to form a loop circuit. The microbial fuel cell can convert chemical energy of small molecule organic materials in the water body treated by the biomimetic intestine into electrical energy with microorganisms in the fuel cell (conversion rate: up to 40%), and the converted electrical energy provides about 20% of the energy required from the aeration of the device. The water body treated by the biomimetic intestine contains a large number of intermediate metabolites, and the special flora in the fuel cell keeps specifically degrading degradation resistant organic materials therein while making use of small molecule organic materials. *Bacteroides* and Lachnospiraceae *Roseburia* are mainly added in an amount of 500 g/m$^3$ river water. When the current density of the microbial fuel cell is less than 10 mA·cm$^{-2}$, *Bacteroides* and Lachnospiraceae *Roseburia* are added in an amount of 200 g/m$^3$ river water per addition. *Bacteroides* and Lachnospiraceae *Roseburia* are common human intestine anaerobic microorganisms, and can degrade small molecule carbohydrates such as peptone, glucose and the like to produce various acids, alcohols, $CO_2$ and $H_2$. Proteinoids degrade organic materials rapidly under the action of the microorganisms, and the transport rate of electron is accelerated by humic acid-like substances. The microbial fuel cell is a device directly converting chemical energy in organic materials into electrical energy with microorganisms. Under an anaerobic environment in the anode chamber, the organic materials are degraded under the action of the microorganisms to release electrons and protons; the electrons are effectively transported between biological components and the anode via electron transport media (humic acid-like substance), and are transported to the cathode via the external circuit to generate current, while the protons are transported to the cathode via the proton exchange membrane; and an oxidant (oxygen introduced by an aeration) is reduced by receiving electrons at the cathode and binds to the protons to produce water.

The upward inclined tube sedimentation tank is consisted of four parts, a water inlet, an inclined tube sedimentation area, a water outlet and a sludge collecting bucket. The river water treated by the microbial fuel cell is forced into the water inlet by the pump; the honeycomb inclined tube structures accumulate the suspended or solidified materials from the incoming water into a thin sludge layer on the bottom surface of the inclined tube structures; the thin sludge layer slides back to a sludge suspension layer under gravity, and then sinks into the sludge collecting bucket, and is discharged into the sludge tank via the perforated sludge discharge tube; and a supernatant rises to the water collecting tube and is discharged via the water outlet on the right side. The sludge tank is cleaned regularly to discharge sludge. The honeycomb inclined tube may be made from an impregnated paper, and may be cured with a phenolic resin and shaped to a fix form. It is typically shaped into a regular hexagon, which has an inscribed circle diameter of 25 mm, an inclined angle of 60 degree, a cushion layer height of 0.5-1.0 m, and a water depth at the upper part of the inclined tube of 0.5-1.0 m. The top end of the inclined tube is inclined towards the water incoming end. The inclined tube sedimentation tank relatively moves the mixture of water and sludge after treatment by the microbial fuel cell and the degradation resistant organic materials in various sediment superficial layers and separates them, increasing the sedimentation area of the sedimentation tank. The flow rate is determined depending on the concentration of organic materials in the water body, typically 0.1-0.5 mm/s.

The aerator can provide the biomimetic intestine tubular purification system and the microbial fuel cell with oxygen. The aeration amount is determined depending on oxygen demands for different black and odorous water bodies. The energy consumed thereby is from an energy generated by a solar cell panel and the microbial fuel cell.

The solar cell panel is 0.2 m in height, and the length and width are determined depending on the requirement for aeration. The solar cell panel converts solar radiation into electrical energy to provide 80% of the energy required for the aeration and the introduction system, and cooperates with the microbial fuel cell to achieve energy self-supply of the device.

The device of the present disclosure utilizes the microbial fuel cell (energy conversion rate: up to 40%) and the solar cell panel to provide the energy required for the whole device, thereby achieving energy self-supply.

In one aspect of the present disclosure, the small intestine intestinal probiotics and the special flora of the microbial fuel cell are main functional bacterium for degrading and metabolizing the black and odorous water body.

The present disclosure makes full use of bionics principle to achieve the purification of black and odorous water body by imitating human digestion system, being subjected to pre-treatment such as aeration, filtration and the like, biologically imitating small intestine contact oxidation, and recycling bottom sludge, while achieving energy self-supply through the power supply of a solar cell panel and a microbial fuel cell.

The present disclosure has advantages of unique construction mode and good sewage purification effect. In practical use, the quality of the water treated by the device of the present disclosure can meet grade IV of surface water.

Specifically, the present disclosure provides the following:

1. A device for treating a black and odorous water body comprising:

(a) a pre-treatment unit for pre-treating the black and odorous water body, wherein the pre-treatment unit comprises a water pump, a water inlet, a water outlet, and barriers with different sizes for physically filtering the black and odorous water body, and a biological enzyme is added into the pre-treatment unit;

(b) a tubular purification system which has an intestinal-like structure in communication with the pre-treatment unit, wherein the tubular purification system comprises a water pump, a water inlet, a water outlet and one or more tubular structures, each comprising an outer wall and a folded inner wall which imitates the inner wall of small intestine; villus-like structures which imitate small intestine villi are densely disposed on the folded inner wall; the villus-like structures are capable of providing support for intestinal probiotics added for degrading organic materials; and an aeration unit is disposed at the bottom of the tubular structures, and is able to provide oxygen into the tubular structures;

(c) a microbial fuel cell in communication with the tubular purification system, wherein the microbial fuel cell has two chambers, one for a microbial anode and the other for an air cathode; a glass fiber membrane is provided between the anode chamber and the cathode chamber as a proton exchange membrane; an external circuit connects the anode with the cathode through a conducting wire; a mixed microflora added attaches to the surface of the anode, and can further degrade the organic materials in the water body treated by the tubular purification system under an anaerobic environment in the anode chamber; and the aeration unit disposed at the bottom of the tubular structure of the tubular purification system is capable of providing oxygen for the cathode chamber;

(d) an inclined tube sedimentation tank in communication with the microbial fuel cell, wherein the inclined tube sedimentation tank comprises a water inlet, a honeycomb-like inclined tube sedimentation area, a water collecting tube, a water outlet, a sludge collecting bucket, a perforated sludge discharge tube, and a sludge tank; the water inlet is positioned below the honeycomb-like inclined tube sedimentation area and the water outlet is positioned above the honeycomb-like inclined tube sedimentation area; the honeycomb-like inclined tube sedimentation area comprises a plurality of inclined tube structures; the inclined tube structures are able to accumulate the suspended or solidified materials from the incoming water into a thin sludge layer on the bottom surface of the inclined tube structures; the thin sludge layer slides back to a sludge suspension layer under gravity, and then sinks into the sludge collecting bucket, and is discharged into the sludge tank via the perforated sludge discharge tube; and a supernatant rises to the water collecting tube and is discharged via the water outlet;

(e) one or more solar cell panels;

wherein the energy to be consumed by the device is from the energy generated by the one or more solar cell panels and the microbial fuel cell.

2. The device according to 1, wherein the biological enzyme added into the pre-treatment unit is a redox enzyme, such as glucose oxidase, glucose dehydrogenase, and ethanol dehydrogenase.

3. The device according to 1, wherein the water inlet of the tubular purification system is provided beneath the tubular structure, the water collecting tube is provided above the tubular structure, and the water outlet is provided on the water collecting tube.

4. The device according to 1, wherein the one or more solar cell panels are provided above the tubular purification system.

5. The device according to 1, wherein the outer wall of the tubular structures in the tubular purification system is made from a material selected from the group consisting of a hard material such as glass fiber reinforced plastic, polyethylene, and polypropylene, and a conducting metal material such as stainless steel.

6. The device according to 1, wherein the folded inner wall of the tubular structures in the tubular purification system is made from polypropylene or polyethylene, and the villus-like structure is made from positively charged carbon fiber.

7. The device according to 1, wherein the intestinal probiotics comprise anaerobic bacteria, facultative bacteria, and aerobic bacteria.

8. The device according to 1, wherein at the starting of the tubular purification system, the intestinal probiotics added are mainly *Phascolafctobacterium* and *Eubacterium eligens*; on 12 to 15 days after the starting of the system, the intestinal probiotics added are *Bacteroides* and Lachnospiraceae *Roseburia*; and on 180 days after the starting of the system, the intestinal probiotics added are an intestinal butyric acid-producing bacteria.

9. The device according to 1, wherein the mixed microflora adhered to the surface of the anode comprises *Bacteroides* and Lachnospiraceae *Roseburia*.

10. The device according to 1, wherein the top end of the inclined tube structure is inclined towards the water inlet.

The present disclosure also provides a method for using the device for treating a black and odorous water body described above.

1. A method for treating a black and odorous water body comprising:

(a) pre-treating the black and odorous water body, wherein the pre-treating comprises physically filtering the black and odorous water body through barriers with different sizes, subsequently adjusting the pH of the water body between 6.8 and 8.0, and then adding a biological enzyme to treat the water body;

(b) passing the pre-treated water body through a tubular purification system which has an intestinal-like structure, wherein the tubular purification system comprises one or more tubular structures, each comprising an outer wall and a folded inner wall which imitates the inner wall of small intestine; villus-like structures which imitate small intestine villi are densely disposed on the folded inner wall; the villus-like structures are capable of providing support for intestinal probiotics added for degrading organic materials; and an aeration unit is disposed at the bottom of the tubular structures, and is able to provide oxygen into the tubular structures;

(c) passing the water body passed through the tubular purification system which has an intestinal-like structure into a microbial fuel cell, wherein the microbial fuel cell has two chambers, one for a microbial anode and the other for an air cathode; a glass fiber membrane is provided between the anode chamber and the cathode chamber as a proton exchange membrane; an external circuit connects the anode with the cathode through a conducting wire; a mixed microflora added attaches to the surface of the anode, and further degrades the organic materials in the water body treated by the tubular purification system under an anaerobic environment in the anode chamber; and the aeration unit disposed at the bottom of the tubular structure of the tubular purification system is capable of providing oxygen for the cathode chamber; and (d) pumping the water body treated by the microbial fuel cell into an inclined tube sedimentation tank, wherein the inclined tube sedimentation tank comprises a water inlet, a honeycomb-like inclined tube sedimentation area, a water collecting tube, a water outlet, a sludge collecting bucket, a perforated sludge discharge tube, and a sludge tank; the water inlet is positioned below the honeycomb-like inclined tube sedimentation area and the water outlet is positioned above the honeycomb-like inclined tube sedimentation area; the honeycomb-like inclined tube sedimentation area comprises a plurality of inclined tube structures; the inclined tube structures accumulate the suspended or solidified materials from the incoming water into a thin sludge layer on the bottom surface of the inclined tube structures; the thin sludge layer slides back to a sludge suspension layer under gravity, and then sinks into the sludge collecting bucket, and is discharged into the sludge tank via the perforated sludge discharge tube; and a supernatant rises to the water collecting tube and is discharged via the water outlet;

wherein an energy to be consumed by the aeration unit is from an energy generated by a solar cell panel and the microbial fuel cell.

2. The method according to 1, wherein the biological enzyme used in step (a) is a redox enzyme, such as glucose oxidase, glucose dehydrogenase, and ethanol dehydrogenase.

3. The method according to 1, wherein when the redox potential in the tubular structures is less than 0 or the dissolved oxygen in the tubular structures is less than 1 mg/L, the aeration unit starts to aerate, and when the redox potential in the tubular structures is more than 200 mv or the dissolved oxygen in the tubular structures is more than 3 mg/L, the aeration of the aeration unit stops.

4. The method according to 1, wherein the outer wall of the tubular structures in the tubular purification system is made from a material selected from the group consisting of a hard material such as glass fiber reinforced plastic, polyethylene, and polypropylene, and a conducting metal material such as stainless steel.

5. The method according to 1, wherein the folded inner wall of the tubular structures in the tubular purification system is made from polypropylene or polyethylene, and the villus-like structure is made from positively charged carbon fiber.

6. The method according to 1, wherein, the intestinal probiotics comprise an anaerobic bacteria, a facultative bacteria, and an aerobic bacteria.

7. The method according to 1, wherein in step (b), at the starting of the tubular purification system, the intestinal probiotics added are mainly *Phascolafctobacterium* and *Eubacterium eligens*; on 12 to 15 days after the starting of the system, the intestinal probiotics added are *Bacteroides* and Lachnospiraceae *Roseburia*; and on 180 days after the starting of the system, the intestinal probiotics added are an intestinal butyric acid-producing bacteria.

8. The method according to 1, wherein the mixed microflora added in step (c) comprises *Bacteroides* and Lachnospiraceae *Roseburia*.

9. The method according to 1, wherein in step (c), when the current density of the microbial fuel cell is less than 10 mA·cm$^{-2}$, additional the mixed microflora is supplemented.

10. The method according to 1, wherein in step (c), the mixed microflora degrades the organic materials under an anaerobic environment in the anode chamber to release electrons and protons; the electrons are transported between biological components and the anode via electron transport media, and are transported to the cathode via the external circuit to generate current, while the protons are transported to the cathode via the proton exchange membrane; and the oxygen introduced by aeration is reduced by receiving electrons at the cathode and binds to the protons to produce water.

BRIEF DESCRIPTION OF DRAWINGS

FIG. 1 is a schematic diagram of the device for treating a black and odorous water body with a bionic process according to the present disclosure. The device consists of the following 4 parts: A. a pre-treatment unit, B. a biomimetic intestine tubular purification system, C. a microbial fuel cell, and D. an inclined tube sedimentation tank.

DESCRIPTION OF REFERENCE NUMBERS FOR MAIN COMPONENTS IN THE DRAWINGS

A. pre-treatment unit
1—water pump; 2—thin barrier; 3—thick barrier; 4—water inlet; 5—biological enzyme; 6—water outlet;
B. biomimetic intestine tubular purification system
7—water pump; 8—tubular outer wall; 9—tube inner cavity; 10—folded small intestine inner wall; 11—tiny villi; 12—aerator; 13—water inlet; 14—water collecting multihole tube; 15—solar cell panel; 16—water outlet;
C. microbial fuel cell
17—water pump; 18—water inlet; 19—water outlet; 20—anode, to the surface of which a mixed microflora or a special flora is adhered; 21—anode chamber; 22—proton exchange membrane; 23—cathode; 24—cathode chamber; 25—oxygen inlet; 26—electric appliance;
D. inclined tube sedimentation tank
27—water pump; 28—water inlet; 29—perforated sludge discharge tube; 30—sludge bucket; 31—inclided tube; 32—water collecting multihole tube; 33—water outlet; 34—sludge tank;
E. enlarged view of the biomimetic intestine tubular purification system
F. sectional view of the inclined tube sedimentation tank

DETAILED DESCRIPTION

The device of the present disclosure is placed in a black and odorous river channel and a river water is first pumped into the pre-treatment unit A from the bottom water inlet 4 by the water pump 1, physically filtered via the thick barrier 3 and the thin barrier 2 in the pre-treatment unit, adjusted to a certain pH, degraded by the biological enzyme 5, and pumped into the tube inner cavity 9 via the water inlet 13 from the water inlet 6 by the water pump 7. The river water moves upward along the inner cavity, and the organic materials are contacted with the folded small intestine inner wall 10, oxidized, degraded, and metabolized. At the same time, the bubbles produced by the aerator 12 are cut by the tiny villi 11 into small bubbles, which provide high concentration active oxidant for the small intestine tubular purification system B, enhancing the oxidation and degradation reaction. The treated river water is pumped into the microbial fuel cell C via the water outlet 16 and the water inlet 18 from the water collecting multihole tube 14 by the water pump 17. A metabolized intermediate product is degraded with a mixed microflora or a special flora adhered to the anode 20 in the anode chamber 21. The protons are transported to the cathode chamber 24 through the proton exchange membrane 22. The oxygen is introduced into the cell via the oxygen inlet 25 from the outside, and accepts the protons at the cathode 23. The cell is externally connected with the electrical appliance 26. A efficient power generation of the microbial fuel cell and an advanced treatment of river water are achieved.

The aerator 12 is dually controlled in terms of the redox potential and dissolved oxygen. When the redox potential is more than 200 mv or the dissolved oxygen is more than 3 mg/L, the aeration is stopped. And when the redox potential is less than 0 mv or the dissolved oxygen is less than 1 mg/L, the aeration starts.

At a beginning of starting of the biomimetic intestine tubular purification system B, microorganisms are added in an amount of 100 g/m$^3$ river water, and the microorganisms are anaerobic bacteria and facultative bacteria, predominantly *Phascolafctobacterium* and *Eubacterium eligens*. On 12 to 15 days after the starting of the system, *Bacteroides* and Lachnospiraceae *Roseburia* are added in an amount of 120-150 g/m$^3$ river water; and on 180 days after the starting of the system, an intestinal butyric acid-producing bacteria is added in an amount of 200-300 g/L.

In the microbial fuel cell C, *Bacteroides* and Lachnospiraceae *Roseburia* are mainly added in an amount of 500 g/m$^3$ river water. When the current density of the microbial fuel cell is less than 10 mA·cm$^{-2}$, *Bacteroides* and Lachnospiraceae *Roseburia* are added in an amount of 200 g/m$^3$ river water per addition.

The treated river water is pumped into the inclined tube sedimentation tank D via the water inlet 28 from the water outlet 19 by the water pump 27. The bottom sludge is sedimented at the inclined tube 31, and then discharged into the sludge tank 34 via the sludge collecting bucket 30 and the perforated sludge discharge tube 29. Clean water is collected by the water collecting multihole tube 32 above, and discharged into the river channel via the water outlet 33.

The energy generated by the microbial fuel cell C and the solar cell panel 15 is supplied to aeration and water body introduction systems, thereby achieving the energy self-supply of the device.

The quality of the outgoing water treated by the device complies with grade IV water quality requirement of "Environmental quality standards for surface water" (GB 3838-2002). According to one embodiment of the present disclosure, after treating the incoming water from a black and odorous water body with a chemical oxygen demand (COD) of 85 mg/L, an ammonia nitrogen amount of 3.0 mg/L, and a total phosphorus amount of 0.6 mg/L according to the present disclosure, the chemical oxygen demand (COD) is reduced to 20 mg/L, the ammonia nitrogen amount is reduced to 1.1 mg/L, and the total phosphorus amount is reduced to 0.18 mg/L. The energy recovery rate is up to 40%.

What is claimed is:

1. A device for treating a black and odorous water body comprising:
    (a) a pre-treatment unit for pre-treating the black and odorous water body, wherein the pre-treatment unit comprises a water pump, a water inlet, a water outlet, and barriers with different thicknesses for physically filtering the black and odorous water body, and a biological enzyme is added into the pre-treatment unit;
    (b) a tubular purification system which has an intestinal-like structure in communication with the pre-treatment unit, wherein the tubular purification system comprises a water pump, a water inlet, a water outlet and one or more tubular structures, each comprising an outer wall and a folded inner wall which imitates the inner wall of small intestine; villus-like structures which imitate small intestine villi are densely disposed on the folded inner wall; the villus-like structures are capable of providing support for intestinal probiotics; and an aeration unit is disposed at the bottom of the tubular structures, and is able to provide oxygen into the tubular structures;
    (c) a microbial fuel cell in communication with the tubular purification system, wherein the microbial fuel cell has two chambers, one comprising a microbial anode and the other comprising an air cathode; a glass fiber membrane is provided between the anode chamber and the cathode chamber as a proton exchange membrane; an external circuit connects the anode with the cathode through a conducting wire; a mixed microflora is attached to the surface of the anode, and can further degrade the organic materials in the water body treated by the tubular purification system under an anaerobic environment in the anode chamber; and the aeration unit disposed at the bottom of the tubular structure of the tubular purification system is capable of providing oxygen for the cathode chamber;
    (d) an inclined tube sedimentation tank in communication with the microbial fuel cell, wherein the inclined tube sedimentation tank comprises a water inlet, a honeycomb-like inclined tube sedimentation area, a water collecting tube, a water outlet, a sludge collecting bucket, a perforated sludge discharge tube, and a sludge tank; the water inlet is positioned below the honeycomb-like inclined tube sedimentation area and the water outlet is positioned above the honeycomb-like inclined tube sedimentation area; the honeycomb-like inclined tube sedimentation area comprises a plurality of inclined tube structures; the inclined tube structures are able to accumulate the suspended or solidified materials from the incoming water into a thin sludge layer on the bottom surface of the inclined tube structures; the thin sludge layer slides back to a sludge suspension layer under gravity, and then sinks into the sludge collecting bucket, and is discharged into the sludge tank via the perforated sludge discharge tube; and a supernatant rises to the water collecting tube and is discharged via the water outlet;
    (e) one or more solar cell panels;
    wherein the energy to be consumed by the device is from the energy generated by the one or more solar cell panels and the microbial fuel cell.

2. The device according to claim 1, wherein the biological enzyme added into the pre-treatment unit is a redox enzyme.

3. The device according to claim 1, wherein the water inlet of the tubular purification system is provided beneath the tubular structure, the water collecting tube is provided above the tubular structure, and the water outlet is provided on the water collecting tube.

4. The device according to claim 1, wherein the one or more solar cell panels are provided above the tubular purification system.

5. The device according to claim 1, wherein the outer wall of the tubular structures in the tubular purification system is made from a material selected from the group consisting of a polymeric material, and a conducting metal material.

6. The device according to claim 1, wherein the folded inner wall of the tubular structures in the tubular purification system is made from polypropylene or polyethylene, and the villus-like structures are made from positively charged carbon fiber.

7. The device according to claim 1, further comprising intestinal probiotics on the villus-like structures, wherein the intestinal probiotics comprise anaerobic bacteria, facultative bacteria, or aerobic bacteria.

8. The device according to claim 7, wherein at the starting of the tubular purification system, the intestinal probiotics comprise *Phascolafctobacterium* and *Eubacterium eligens*; on 12 to 15 days after the starting of the system, the intestinal probiotics comprise *Bacteroides* and Lachnospiraceae *Roseburia*; and on 180 days after the starting of the system, the intestinal probiotics comprise an intestinal butyric acid-producing bacteria.

9. The device according to claim 1, wherein the mixed microflora in the microbial fuel cell comprises *Bacteroides* and Lachnospiraceae *Roseburia*.

10. The device according to claim 1, wherein the top end of the inclined tube structure is inclined towards the water inlet.

11. The device according to claim 2, wherein the redox enzyme is glucose oxidase, glucose dehydrogenase, or ethanol dehydrogenase.

12. The device according to claim 5, wherein the polymeric material is glass fiber reinforced plastic, polyethylene, or polypropylene.

13. The device according to claim 5, wherein the conducting metal material is stainless steel.

* * * * *